Sept. 8, 1931.  W. D. KMENTT  1,822,099
APPARATUS FOR PLACING WASHERS ON HEEL MOLD PINS
Filed March 5, 1929  3 Sheets-Sheet 1
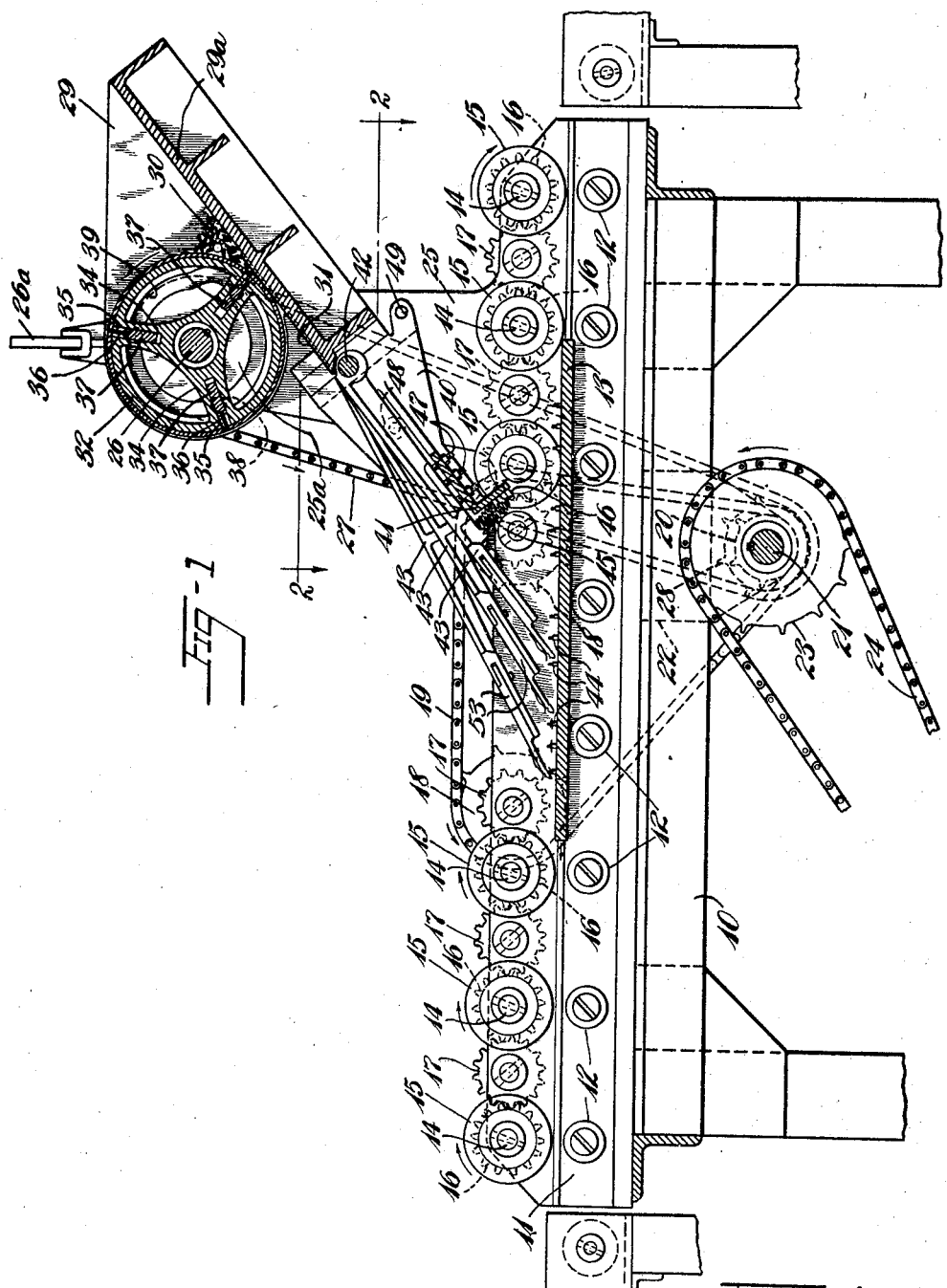

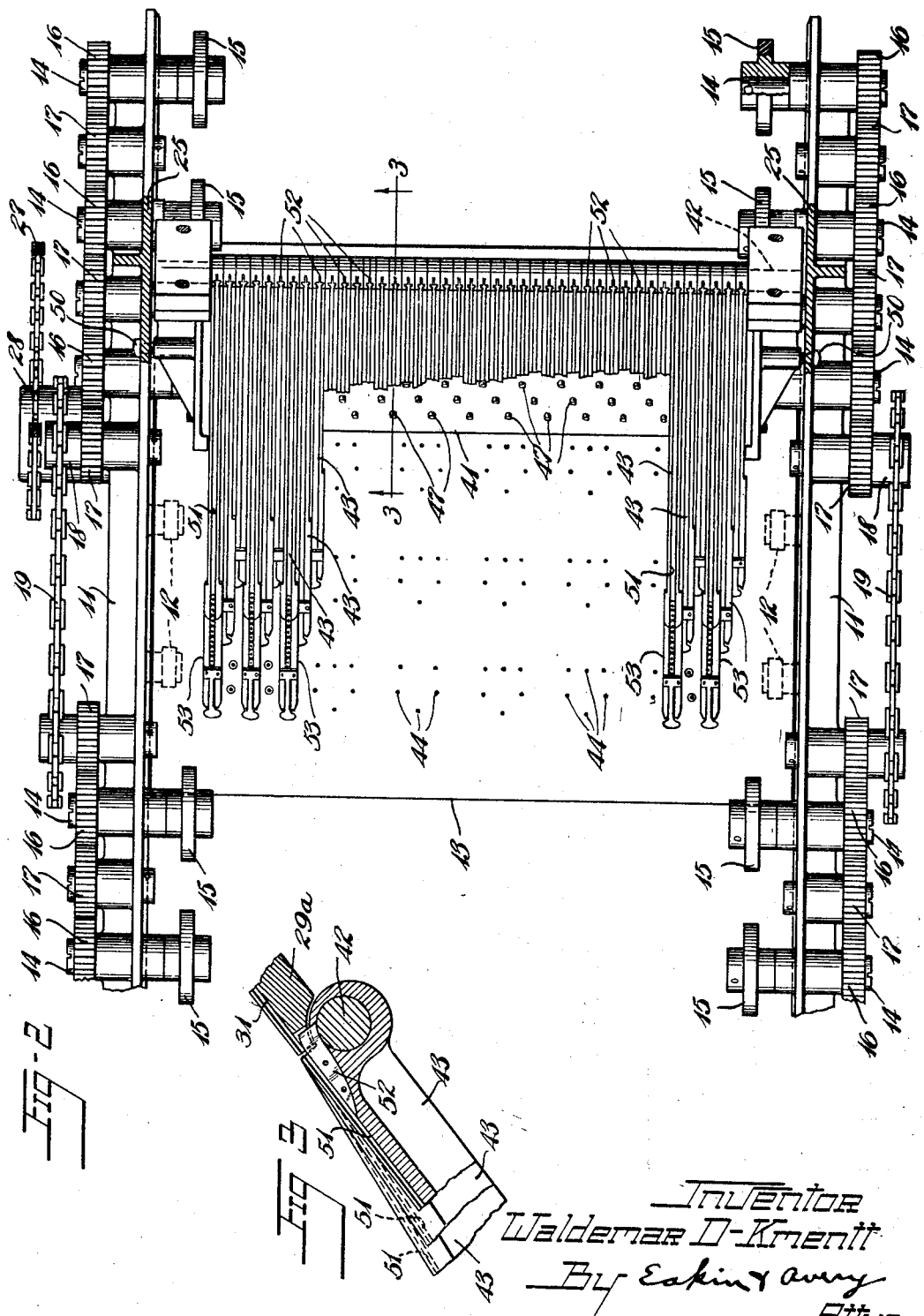

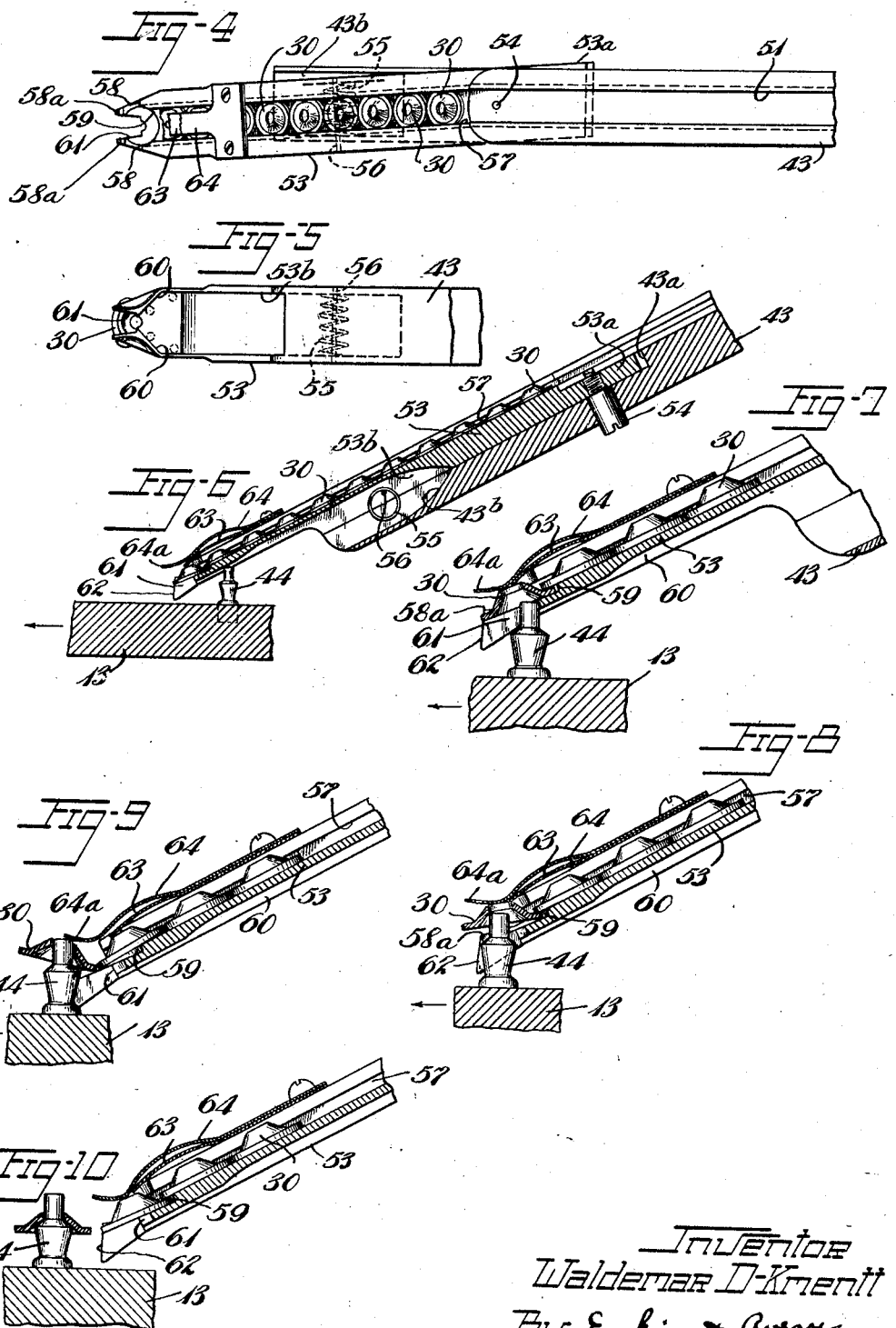

Patented Sept. 8, 1931

1,822,099

UNITED STATES PATENT OFFICE

WALDEMAR D. KMENTT, OF AKRON, OHIO, ASSIGNOR TO THE B. F. GOODRICH COMPANY, OF NEW YORK, N. Y., A CORPORATION OF NEW YORK

APPARATUS FOR PLACING WASHERS ON HEEL-MOLD PINS

Application filed March 5, 1929. Serial No. 344,281.

This invention relates to apparatus for placing washers upon the pins of a mold for rubber heels, and comprises certain new and useful improvements in automatic mechanism for feeding the washers from a hopper containing the same to a mold member having upstanding washer-supporting pins thereon, and in escapement mechanism for depositing the washers upon said pins.

The chief objects of the invention are to provide automatic apparatus for the purpose mentioned which will be universal in its application to molds of all sizes and to molds having various arrangements and sizes of pins thereon; to provide apparatus which will deposit but one washer on each mold pin; to provide means for preventing washers from jumping off the mold pins as they are deposited thereupon; and in general to provide an apparatus for the purpose mentioned which in construction and operation will be superior to devices heretofore provided for the same purpose.

Of the accompanying drawings:

Fig. 1 is a vertical section through apparatus embodying my invention in its preferred form.

Fig. 2 is a plan view of the apparatus taken on line 2—2 of Fig. 1.

Fig. 3 is a section on line 3—3 of Fig. 2.

Fig. 4 is a plan view of washer-placing tool.

Fig. 5 is a reverse plan view of the tool shown in Fig. 4.

Fig. 6 is a detail sectional view of a tool and a mold pin as the same are positioned at the initial phase of a washer-placing operation.

Figs. 7, 8, 9 and 10 are views similar to Fig. 6, on a larger scale, showing successive phases of a washer-placing operation, including the final phase.

As shown in Fig. 1, the invention comprises a mold carrier, means for placing washers upon the pins of a mold on said carrier, and a hopper for supplying the washer-placing means with properly arranged washers. The details of the mold carrier and the hopper are not a part of the present invention, the hopper being a part of the subject-matter of my earlier invention, Patent No. 1,501,492, of July 15, 1924.

Referring to the drawings, the apparatus comprises a framework or table 10, which is provided at its opposite sides with elongated journal brackets 11, 11, upon which are journaled respective horizontal rows of idler rolls 12, 12, adapted between them to support mold members such as the mold member 13 by engagement with their opposite marginal portions. Also journaled in suitable bosses formed on the brackets 11, above the idler rolls 12, are respective horizontal rows of shafts 14, 14, upon the inner ends of which are mounted respective friction-surfaced drive rolls 15, 15 adapted to engage the top surface of the mold member 13 to propel it over the idler rolls 12. The outer ends of the shafts 14 are provided respectively with gears 16, 16, which are meshed with intermediate gears 17, 17 mounted upon respective stub shafts on the brackets 11, the arrangement being such that all the drive rolls 15 may be concurrently driven in the same direction.

The drive rolls 15, shafts 14, and gears 16, 17 are omitted in the region of the apparatus where washers are placed upon the mold pins, to provide space for the washer-placing mechanism. For driving the respective series of drive rolls 15 on opposite sides of the apparatus, the gears 17, 17 at each side of the gap in each series, at the washer-placing zone, are provided with sprockets 18, 18, and sprocket chains 19, 19 connect the respective pairs of sprockets 18 with respective sprockets, such as the sprocket 20, Fig. 1, mounted upon the opposite ends of a counter-shaft 21. The latter is journaled in suitable brackets, such as the bracket 22, beneath the table 10 and is provided with a sprocket 23 connected by a sprocket chain 24 with a suitable source of driving power (not shown).

Rising from the respective brackets 11, at that end of the apparatus which first receives the mold member 13, are brackets 25, 25, in the upper portions of which is journaled a shaft 26, driven by a sprocket chain 27 from a sprocket 28 mounted upon the counter-shaft 21. Preferably a clutch (not shown), manually operable by a shipper lever 26ª, is provided between the shaft 26 and the sprocket chain 27 to permit rotation of the shaft 26 to be stopped while other driven parts of the machine continue to operate. The shaft 26 supports the washer-placing mechanism and a hopper or magazine 29 adapted to receive a charge of washers 30, 30 in bulk or chance arrangement, the washers being of the frusto-conical type commonly used in molded shoe heels. The floor 29ª of the hopper 29 slopes downwardly toward its front end, and its top face is formed with a series of parallel, undercut guide-tracks or grooves, such as the groove 31, Fig. 1, extending rearwardly from its front margin to a central portion of the floor, the number of grooves corresponding to the number of washer-placing tools to be provided.

In lieu of a front wall, the hopper 29 is provided with a rotary drum 32, the periphery of which is disposed close to the floor 29ª, over the grooves 31 therein, so that the latter provide the only exit from the hopper for the washers 30. The body of the drum 32 is formed with radial webs or spokes 34, 34, whereby its peripheral portion is connected with its hub portion on the shaft 26, and the periphery of the drum is longitudinally slotted throughout its length at 35, 35 at three equidistant points to form guide apertures or slots, through which are radially reciprocated a series of three blades or paddles 36, 36 attached to respective bars 37, which are mounted in guideways formed in the spokes 34. The ends of these blades are provided with studs 38 occupying a pair of similar cam grooves, such as the cam groove 39, Fig. 1, formed in a stationary plate 25ª, which forms a closure for one end of the drum 32, said plate being secured in any suitable manner to the side wall of the hopper, or comprising an integral part thereof.

The major portion of each cam groove 39 is made approximately circular, concentric with the shaft 26, to hold the blades 36 retracted within the periphery of the drum throughout the major portion of their orbit. The minor portion of the cam groove 39, toward the rear of the hopper, is radially extended to project each blade successively in an upward or backward sweep in the hopper, the direction of rotation of the drum being counter-clockwise, as indicated by the arrow in Fig. 1. The arrangement is such that the blades 36 sweep the washers 30 backward away from the entrances to the respective grooves 31 so that as the washers thereafter fall toward said grooves, properly positioned washers in alignment with the grooves will pass thereinto and move therein by gravity toward the washer-placing mechanism aligned with the lower ends of said grooves.

Secured to the lower portion of the hopper 29, at opposite sides thereof, are brackets 40, 40, which extend obliquely downward and have their lower ends connected by an integral L-shaped plate 41, which is disposed transversely of the table 10 somewhat above the same. Adjacent the lower margin of the floor 29ª of the hopper, the brackets 40 support a nonrotatable shaft or bar 42, upon which are swiveled a plurality of washer-placing tools or fingers, generally designated 43, 43, which extend obliquely downward toward the work and have their delivery ends determinately positioned adjacent thereto.

Each of the tools 43 is arranged for limited lateral movement at its delivery end, as will be more fully described hereinafter, and the tools are so positioned laterally that they slightly overlap each other in their ability to engage mold pins passing their delivery ends. The arrangement is such that all mold pins passing the delivery ends of the tools 43 will receive washers therefrom, whatever the position or height of the pins on the mold member.

The hub portions of the tools 43 are relatively narrow, which permits a relatively great number of them to be mounted on the shaft 42 in laterally abutting relation. The delivery ends of the tools 43 are wider than their hub portions, and in order that each tool may function without interference from adjacent tools, said tools are made to different lengths and arranged in several series, herein shown as three, which series are so intercalated that there is relatively wide spacing between adjacent tools of a series and between the delivery ends of the several series. The arrangement permits the use of a large number of tools, permits them to pivot freely upon the shaft 42, permits lateral movement of their delivery ends without interference from adjacent tools, and permits such close positioning of the tools that they overlap each other in their ability to engage mold pins passing their delivery ends.

The lower ends of the tools 43 preferably are positioned slightly above the upper surface of the mold member 13, yet close enough thereto to be engaged by mold pins 44, 44 rising from said mold member, the tools being yieldingly urged downwardly toward the mold member by respective tension springs 45, 45, which are connected to the under side of the tools and to respective studs 46 projecting from the L-shaped plate 41. Respective adjustment bolts 47, 47 are threaded through the plate 41 and engage the under sides of the tools 43 for positioning the lower ends of the latter with relation to a mold member 13. Since the pins 44 may be of different heights on different molds, the ends of the tools 43 are positioned sufficiently close to the mold member 13 to engage the shortest pins.

Each of the brackets 40 is formed with two recesses 48, 49 arranged on an arc concentric with the shaft 26, said recesses being adapted alternatively to receive the end of a stud-bolt 50 threaded through the adjacent bracket 25. The arrangement is such that when the bolt 50 is seated in the recess 48 the tools 43 occupy their operative positions as shown in Fig. 1, yet permits the brackets 40 to be swung about the shaft 26 and the bolt inserted in the recess 49 to hold the tools in an elevated, substantially horizontal, inoperative position.

The top face of each washer-placing tool 43 is formed with an undercut guide-track or groove 51, and the grooves in the respective tools are coincident or longitudinally aligned with the series of grooves 31 in the floor 29a of the hopper 29 and are adapted to receive a file of washers issuing from the latter. A bridge member 52 is mounted in each of the tools 43 at the hinge end thereof, spanning the gap between the tool and the adjacent margin of the hopper floor 29a, and having its upper edge flush with the bottom of the groove 51, the function of the bridge member being to carry washers from the groove 31 across said gap to the groove 51.

Each washer-placing tool 43 is articulated adjacent its lower or delivery end to provide limited lateral movement thereat, the construction being clearly shown in Figs. 4 and 6. The laterally movable portion of the tool comprises a member 53, which is mounted upon the lower end portion of the tool 43 and extends beyond the end thereof, the member 53 being formed with a tongue portion 53a, which fits within a complemental slot 43a in the tool 43 and is pivotally secured therein by a stud 54 extending through an underlying portion of the tool 43 and threaded into the tongue 53a. The under side of the member 53 is recessed at 53b, and the adjacent upper face of the tool 43 is similarly recessed at 43b, and a compression spring 55 is mounted in said recesses, upon a pin 56 mounted in the member 53, in such a manner as to intersect the meeting plane of the members 43, 53. The arrangement is such that angular movement of the member 53 upon its pivot 54 is yieldingly resisted by the spring 55, which normally serves to keep the members 43, 53 in longitudinal alignment.

The upper face of each member 53 is formed with a longitudinal, undercut, washer-guiding groove 57, and said groove is normally aligned with the similar groove 51 of the tool 43. The length of the groove 57 preferably is an even multiple of the diameter of a washer 30, so that the grooves 57, 51 adjoin each other between two washers to permit unobstructed angular movement of the member 53. At the lower end of the member 53 the overhanging flanges of the groove 57 are cut away, as shown at 58, 58, Fig. 4, to provide an exit, substantially of the size of a washer, between the ends of said flanges and a pair of abutments 58a, 58a formed at the end of the member 53. The floor of the groove 57 at the extreme end of the member 53 is formed with an oblique counter-bore 59, which at its rear is of substantially the same depth as the thickness of the metal of a washer, the front margin of the counter-bore being disposed substantially flush with the extended floor of the groove 57. Said counter-bore is adapted to receive the lowermost washer of the file of washers 30, 30 in the groove 57.

On the under side of the member 53, the recess 53b is carried toward the nose of the member, and its lateral walls or flanges 60, 60 provide means for engaging mold pins 44 on a mold member 13. The flanges 60, adjacent the nose of the member, converge toward each other and terminate at each side of a substantially V-shaped slot 61 near the end thereof, said slot extending into the member 53 from the free end thereof to a point in line with the hole in the lowermost washer in the groove 57. The foot of the member 53 at each side of the slot 61 is of increased thickness as shown at 62, to cause the tool to ride upon and over mold pins which have washers thereon to prevent the depositing of more than one washer upon each mold pin, the tool being thereby elevated so that the mold pin will not engage the lowermost washer therein.

Secured to the top face of the member 53, a short distance from the lower end thereof, are a pair of leaf springs 63, 64 constituting escapement mechanism, of which the latter is of greater length and is superposed upon the spring 63. Both springs are arcuate in form, with their concave sides facing the file of washers, the spring 64 having the the shorter radius and standing clear of the spring 63 except at the end portions of the latter. The length of the spring 63 is such that its free end portion is disposed over the hole in the lowermost washer of the file of washers in the groove 57, and said end portion normally stands clear of said lowermost washer when the overlying spring 64 is raised. The spring 64 bears upon the end portion of the spring 63 to urge the latter toward the file of washers, and the end portion of the spring 64 is bent in a reverse curve over the end of the spring 63 and terminates in flat portion 64a, which is disposed substantially parallel to the plane of the mold member 13.

In the operation of the apparatus, a charge of the washers 30 is placed in the hopper 29, and the shaft 21 is driven to rotate the drum 32 and thereby to agitate and periodically backsweep the washers so that properly positioned washers will pass into the grooves 31 of the hopper and flow by gravity therefrom, through the grooves 51 of the tools 43, to the delivery ends of the latter, where the lowermost washers rest in the counter-bores 59 therein. The drive rolls 15 also are driven from the shaft 21, so that a mold member 13 supported upon the idler rolls 12 will be fed forward thereover and the mold pins 44 on the mold member carried into engagement with the delivery ends of the washer-placing tools 43. As hereinbefore stated, the tools 43 are so closely spaced laterally that they overlap each other in their ability to engage mold pins, so that every mold pin 44 will be engaged by at least one of the tools. A pin first engages a tool on the under side of the tool member 53 in the extension of its recess 53$^b$ between the flanges 60 where the latter are parallel to each other, and if the pin is disposed at either side of the center line of the tool it will, upon engagement with the converging portions of said flanges, cause the member 53 to swing upon its axis 54, as shown in Fig. 4, and thereby bring the slot 61 in said member into alignment with the pin.

As shown in Fig. 6, the top of the pin 44 is higher than the closed end of the slot 61 when the tool is in normal inoperative position, so that in engaging the tool and moving toward said slot the pin raises the free end of the tool, as shown in Fig. 7, against the tension of the spring 45, the tool pivoting about its shaft 42. Thus, as the moving pin 44 passes into the slot 61, the tool drops, as shown in Fig. 8, and the washer 30 in the counter-bore 59 of the tool strikes the pin 44 in the manner shown in front of the hole in said washer, the front end of the latter thereby being lifted above the level of the abutments 58$^a$, against the pressure of the springs 63, 64, while the rear end of the washer pivots about its margin as said margin is held down by the overlying succeeding washer.

The provision of the counter-bore 59, which permits the succeeding washer to overlie the trailing edge of the leading washer, causes the washer engaged by a mold pin to assume a substantially horizontal position thereon before it is completely withdrawn from the tool, so that it drops easily and quickly upon the mold pin and thereafter is not easily dislodged therefrom.

Continued movement of the pin 44 draws the washer from the end of the tool, as shown in Fig. 9, the flat end portion 64$^a$ of the spring 64 forcing the washer onto the pin and then remaining in contact with the end of the pin to prevent the washer from jumping off. As the washer is withdrawn from the tool, the file of washers in the tool moves forward by gravity and the leading washer of the file moves into the counter-bore 59 and against the abutments 58$^a$ before the spring 64 is disengaged from the pin 44. Any tendency of the leading washer of the file to follow the preceding washer out of the tool, or to do otherwise than move into the counter-bore, is opposed by the spring 63. The oblique arrangement of the counter-bore 59 permits the leading edge of a washer to drop thereinto without such elevation of its trailing edge as would permit the succeeding washer to move under said trailing edge.

My invention may be modified within the scope of the appended claims.

I claim:

1. In apparatus for placing washers on heel mold pins, the combination of a plurality of washer-placing tools so arranged that their mold-pin-engaging zones normally overlap each other in a series which traverses the course of a heel mold, and means for supplying said tools with washers.

2. Apparatus as defined in claim 1, in which the washer-supplying mechanism comprises a hopper common to the several tools.

3. In apparatus for placing washers on heel mold pins, the combination of a plurality of pivotally mounted washer-placing tools arranged in a series which traverses the course of a heel mold, a support upon which said tools are co-axially mounted, and means for feeding washers to said tools.

4. In apparatus for placing washers on heel mold pins, the combination of a plurality of pivotally mounted washer-placing tools arranged in several spaced apart series which traverse the course of a heel mold, a common pivotal support for all of said tools, and means for feeding washers to said tools.

5. Apparatus as defined in claim 4, in which the washer-feeding means comprises a single hopper.

6. In apparatus for placing washers on heel mold pins, the combination of a washer-placing tool comprising a washer guiding member suspended from its upper end and articulated at a point remote therefrom, and means for supplying the same with washers.

7. In apparatus of the character described, the combination of a washer-placing tool comprising a washer guiding member suspended from its upper end and articulated at a point remote therefrom, yielding means normally maintaining the respective parts of said member in longitudinal alignment, and means for supplying the tool with washers.

8. Apparatus as defined in claim 7, in which the tool is pivotally mounted.

9. In apparatus of the character described, the combination of a plurality of pivotally mounted washer-placing tools each comprising a washer guiding member articulated for lateral displacement, a single supporting member upon which said tools are co-axially mounted, and means for feeding washers to the tools.

10. In apparatus of the character described, the combination of a washer-placing tool formed with a washer-guiding groove therein and articulated within the extent of said groove, means for feeding washers into one end of said groove, and mechanism at the other end of said groove for yieldingly retaining a washer.

11. Apparatus of the character described, comprising a washer-placing tool comprising a washer guiding member articulated near its delivery end and formed with a groove therein, and yielding means normally closing the delivery end of said groove.

12. Apparatus of the character described, comprising a washer-placing tool formed with a washer-guiding groove therein, said groove being so formed with a counterbore at the delivery end thereof that a washer at that end of said groove is partly overlain by the succeeding washer in said groove, and yielding means normally closing the delivery end of the groove.

13. Apparatus of the character described, comprising a washer-placing tool formed with a washer-guiding groove, said groove terminating in a counter-bore adapted to accommodate the leading washer of a file of washers in the groove, and a spring normally bearing against the washer in said counter-bore.

14. Apparatus of the character described, comprising a washer-placing tool formed therein with a guiding groove for a file of washers, and escapement mechanism at the delivery end of said groove comprising a yielding member adapted to engage the leading washer of the file as it is withdrawn from the groove, and a yielding member for concurrently engaging the succeeding washer of the file, the yielding members being adapted jointly to retain the leading washer of the file when no washers are being withdrawn therefrom.

15. Apparatus of the character described, comprising a washer-placing tool formed with a washer-guiding groove, said groove terminating in a counter-bore adapted to accommodate the leading washer of a file of washers in said groove, and a pair of springs normally bearing against the washer in said counter-bore and adapted, as said leading washer is withdrawn, to engage respectively said leading washer and the washer succeeding it.

In witness whereof I have hereunto set my hand this 2nd day of March, 1929.

WALDEMAR D. KMENTT.